United States Patent Office 3,003,605
Patented Oct. 10, 1961

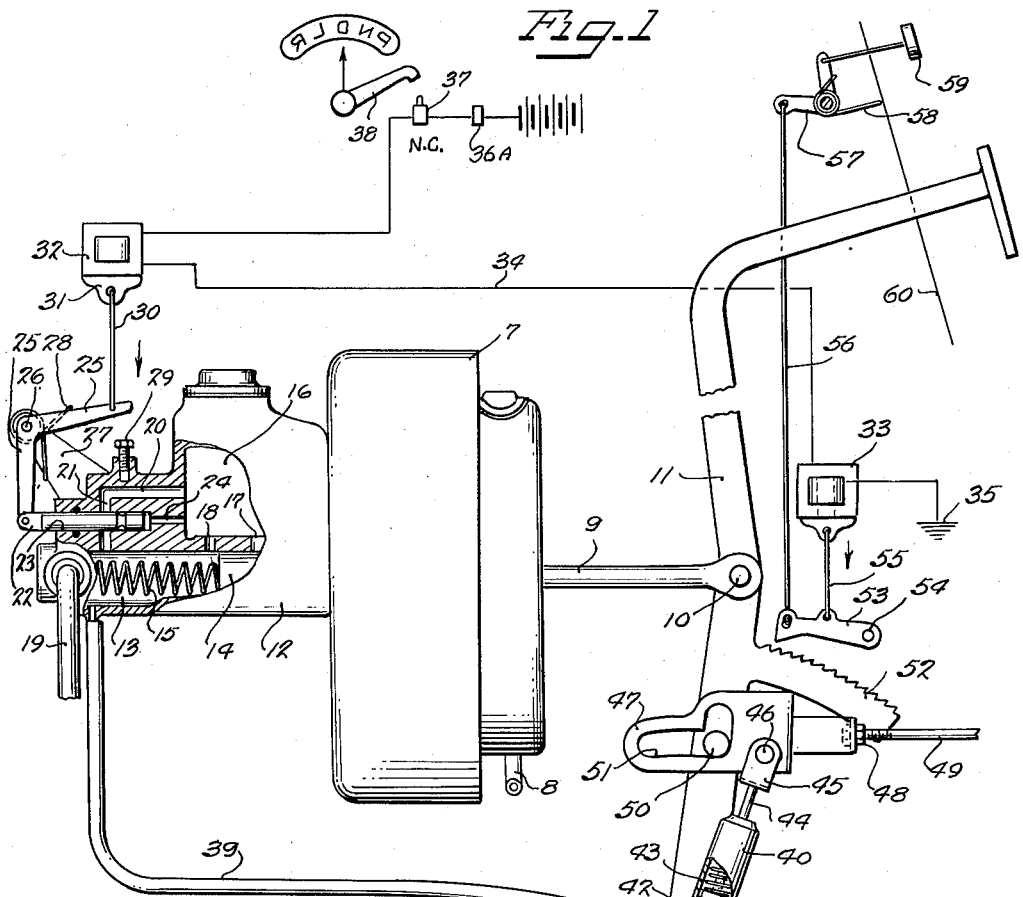
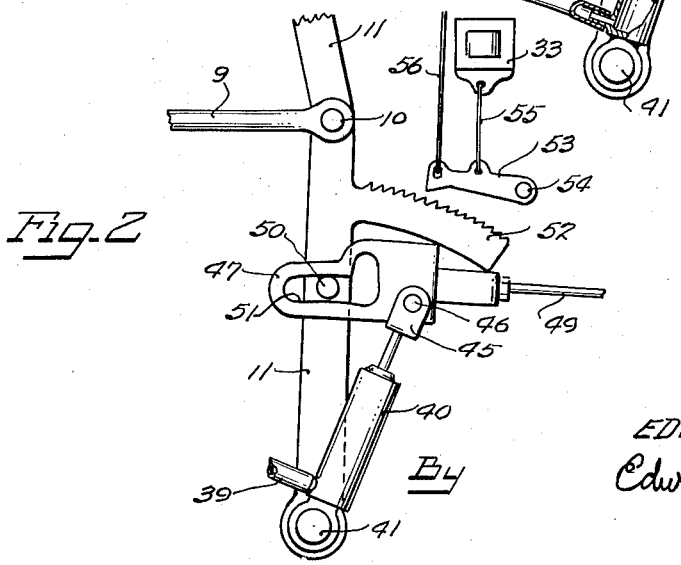

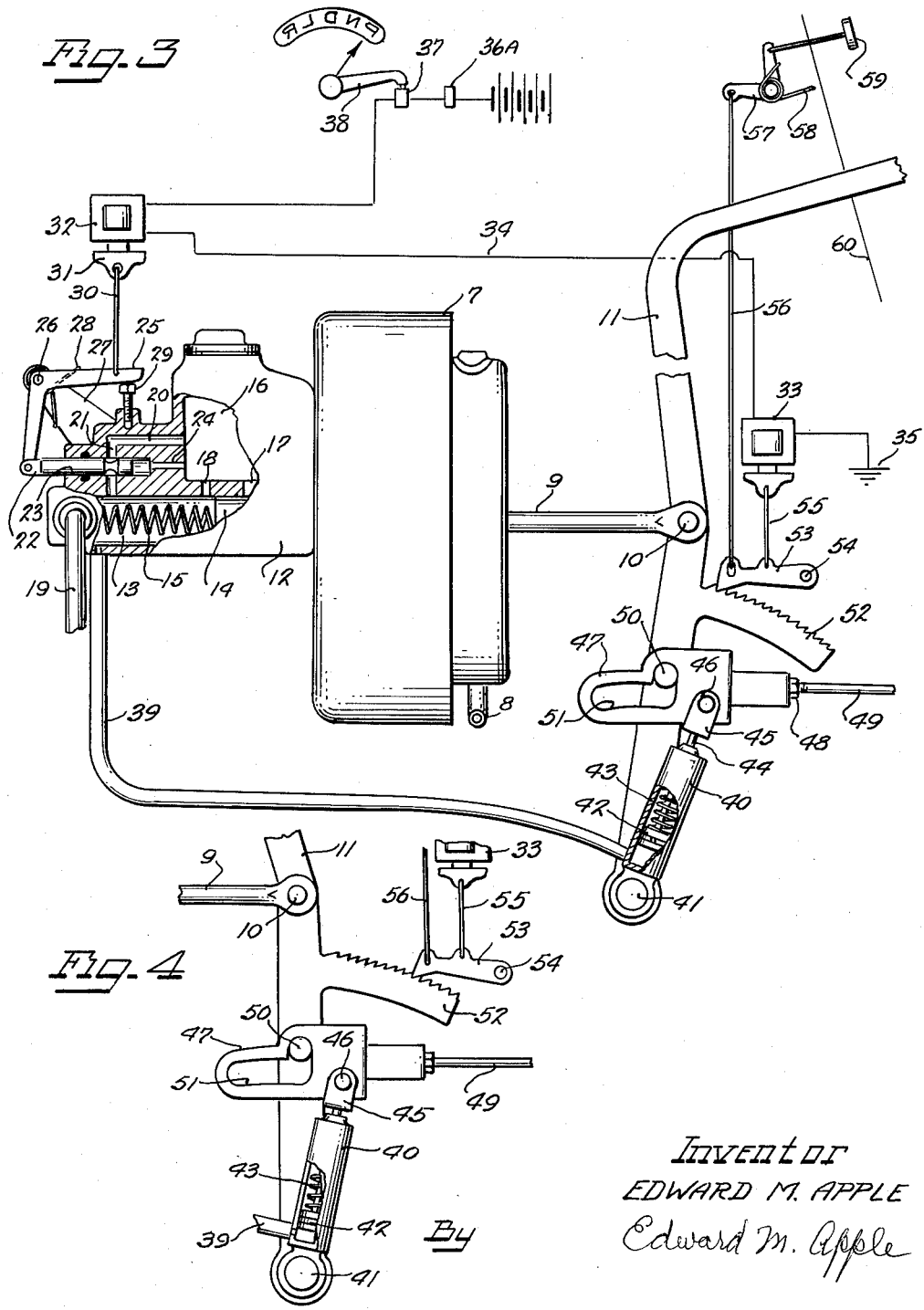

3,003,605
SINGLE LEVER, POWER ACTUATED, SERVICE
AND EMERGENCY BRAKE SYSTEM
Edward M. Apple, Milan, Mich. (2607 David Stott
Bldg., Detroit 26, Mich.), assignor to Joseph Martin,
Detroit, Mich.
Filed Nov. 25, 1960, Ser. No. 71,607
12 Claims. (Cl. 192—4)

This invention relates to power operated braking systems for motor vehicles with automatic transmissions, and has particular reference to a power operated service brake and a power operated emergency brake, each of which is controlled by a single brake lever.

This invention may be considered an improvement on the device disclosed in United States Patent No. 2,910,156, issued to Apple on October 27, 1959, which in turn was an improvement on the device disclosed in United States Patent No. 2,821,275, issued to Martin on January 28, 1958.

It is well known to those working in the automotive arts, that the travel of the brake lever in conventional power operated brake systems is very limited, and for that reason it would be very difficult, if not impossible, to use a single brake lever to actuate both the service brake and the emergency brake, while at the same time, maintaining the freedom of action and independency of the emergency brake system from that of the service brake system, which is a legal requirement in many of the States of the United States.

It is, therefore, a prime object of this invention to obviate the foregoing difficulties.

Another object of the invention is to provide a conventional power actuated service brake with means for actuating the emergency brake, with the same power, whereby the service brake and the emergency brake are actuated, independently of the other, by means of a single brake lever.

Another object of the invention is to provide a power brake device of the character indicated, with power means for setting and releasing the emergency brake, which power means are responsive to the movement of the automatic transmission speed selector controls.

Another object of the invention is to provide power means for operating the service brakes and power means for setting and locking the emergency brake, each of which power means are controlled by a single brake lever, there being means co-acting between the speed selector control of the automatic transmission, and said power means, for rendering inoperative the emergency brake power means during the operation of the service brake power means.

Another object of the invention is to provide a device of the character indicated, with power means for releasing the emergency brake, when the automatic transmission speed selector is moved to any position other than "park."

Another object of the invention is to provide a device of the character indicated, which is provided with power means for holding the emergency brake in locked position when the automatic transmission speed control is in "park" position.

Another object of the invention is to provide a device of the character indicated, which is provided with means for holding the emergency brake in locked position, when the automatic transmission speed selector is in "park" position, there being power means for unlocking said emergency brake mechanism, when the automatic transmission speed selector control is in any position other than "park."

Another object of the invention is to provide a device of the character indicated, in which the emergency brake can be power set and locked by a dual purpose foot brake lever and may be released by means operable from the dashboard.

Another object of the invention is to provide a device of the character indicated, which is provided with means for automatically rendering the emergency brake operative by the service brake lever in the event of the loss or disconnection of the electric power in the vehicle.

The foregoing and other objects and advantages of the invention will become more apparent as the description proceeds, reference being made from time to time to the accompanying drawings, forming part of the within disclosure, in which drawing:

FIG. 1 is a diagrammatic view, with parts in elevation and parts in section, of a device embodying the invention, wherein the automatic transmission speed selector is in "drive" position and the power service brakes are in normal driving position, with the service brakes and emergency brake "off."

FIG. 2 is a fragmentary view of the mechanism shown in FIG. 1, showing the position of the brake lever, and associated parts, with the emergency brake "off" and the service brakes "on."

FIG. 3 is a view similar to FIG. 1, but showing the automatic transmission speed selector in "park" position, with the emergency brake in operative position, but before the brake lever is moved into the emergency brake locking position.

FIG. 4 is a fragmentary view of the mechanism shown in FIG. 3, after the brake lever has been moved to apply and lock the emergency brake.

Referring now more particularly to the drawings, it will be understood that in the embodiment herein disclosed the reference character 7, indicates a conventional vacuum cylinder, which is connected through a vacuum hose 8, to the intake manifold of the motor vehicle, or to a vacuum tank, as in conventional practice. The vacuum cylinder 7, contains a conventional diaphragm (not shown) to which is connected the operating rod 9, which in turn is pivoted as at 10, to the brake lever 11, as in conventional practice. Secured to the vacuum cylinder 7, is a housing 12, in which is formed a master cylinder 13, in which reciprocates a piston 14, which is connected by suitable linkage, to the diaphragm of the vacuum cylinder 7, as in conventional practice. The piston 14 is spring-loaded as at 15, as in conventional practice. Brake fluid is carried in a fluid reservoir 16, formed in the housing 12, and is supplied to the master cylinder 13, through ports 17 and 18. The hydraulic fluid is forced from the master cylinder 13 into the fluid distributor line 19, and hence through the fluid lines to the respective slave cylinders at each wheel (not shown), all of which is conventional, power actuated, fluid brake mechanism used in conventional practice, and forms no part of the within invention, except as it is combined with the elements hereinafter described.

The housing 12, is provided with a by-pass 20, which communicates between the reservoir 16 and a passageway 21, which in turn communicates with the interior of the master cylinder 13. The passageway 21 is controlled by a slide valve 22, which reciprocates in a suitable bore 23, formed in the housing 12. The bore 23 also communicates with the reservoir 16, through a small relief passageway 24. The slide valve 22 is reciprocated by means of a bell crank 25, which is pivoted as at 26, on a bracket 27, which is secured to the housing 12. The bell crank 25 is urged in a clock-wise direction by means of a torsion spring 28. An adjustable stop 29 is provided in the housing 12, to limit the movement of the bell crank 25, when the electric current is cut off from the solenoid 32. One arm of the bell crank 25 is connected by a rod 30, to the core 31 of a solenoid 32, which is connected in series to a second solenoid 33, as at 34. Both solenoids 32 and 33 are grounded as at 35. The solenoids 32 and 33 are electrically connected to the storage battery 36 of the vehicle, and are controlled by the ignition switch 36A of the vehicle, and the normally closed switch 37, which is arranged to be opened by the automatic transmission speed selector arm 38, when it is moved into "park" position, as shown in FIG. 3. When the speed selector arm 38 is in any position other than "park," as shown in FIG. 1, the solenoids 32 and 33 will be energized, and the slide valve 22 will be in the position shown in FIG. 1, closing the by-passes 20 and 21, so that the master-cylinder 13 and the piston 14 are in normal operating condition for the operation of the power service brakes, through the vacuum cylinder 7, the hydraulic master cylinder 13, and slave cylinders (not shown).

In order to operate the emergency brake through the common brake lever 11, I provide a hydraulic line 39, which communicates with the master cylinder 13, and a control cylinder 40, which is pivoted as at 41, to the lower end of the brake lever 11. The cylinder 40 is provided with a piston 42, which is spring-backed as at 43, and is secured by means of a rod 44 to a clevis 45, which is pivoted, as at 46, to a latch plate 47, which is secured, as at 48, to the end of the emergency brake rod 49. A latch pin 50 is secured to the brake lever 11 and is adapted to co-operate with the cam slot 51, in the latch plate 47.

During normal driving, the hydraulic pressure in the master cylinder 13, and in the control cylinder 40, is sufficient to move the piston 42, the rod 44, and the clevis 46 upwardly, as shown in FIG. 1, so that the brake lever 11 is free to actuate the service brakes, without affecting the emergency brake, because the latch pin 50 is free to travel in the cam slot 51. Under normal conditions the brake lever 11, only has to travel a short distance, in order to effect the application of the power service brakes. When the hydraulic pressure in the master cylinder 13 is reduced, either by reason of leakage from the fluid lines, or when the slide valve 22 is moved into the position shown in FIG. 3, the spring 43, in the cylinder 40, will cause the latch plate 47 to be pulled downwardly, as shown in FIG. 3, in which position the emergency brake may then be actuated by the brake lever 11.

The brake lever 11 is provided with a ratchet 52, which can be engaged by a dog 53, which is pivoted as at 54, and is connected, by means of a rod 55, to the core of the solenoid 33. The actuation of the solenoid 33 causes the dog 53 to engage the ratchet 52 and the emergency brake will be held in locked position. The dog 53 may be released by a pull rod 56, which is secured to a rocker arm 57, which is spring-backed as at 58, and may be released by pulling the handle 59. It is also contemplated that the release of the dog 53, may be effected by vacum, or hydraulic power, as taught in previous patents issued to Martin and Apple, as indicated above.

The operation of the device is as follows. As long as the ignition switch 36A is turned on, and the automatic transmission speed selector arm 38 is in any position, other than "park," the slide valve 22, remains closed, as shown in FIG. 1, and is held in this position by the solenoid 32. So long as the slide valve 22 remains closed, the power actuated service brakes operate in their normal manner. The hydraulic pressure in the master cylinder 13, also passes through the hydraulic line 39 to the control cylinder 40, and moves the piston 42 upwardly, at the same time moving the piston rod 44, and the latch plate 47 correspondingly, as shown in FIG. 1. In this position the latch pin 50 rides free in the cam slot 51, and the emergency brake does not operate when the service brakes are applied. In this position also the solenoid 33 holds the dog 53 out of engagement with the ratchet 52, so that the service brakes may be freely and independently operated by the brake lever 11, through the piston rod 9, etc. as in conventional practice.

When the automatic transmission speed selector arm 38 is moved to "park" position, as shown in FIG. 3, the normally closed switch 37 is opened, thereby breaking the circuit to the solenoids 32 and 33. When the solenoid 32 is de-energized, the bell crank 25 is rotataed in a clock-wise direction, under the influence of the torsion spring 28. This causes the slide valve 22 to move outwardly to the position shown in FIG. 3. When the slide valve 22 is in the outward position, the passageways 20 and 21 place the cylinder 13 in direct communication with the interior of the reservoir 16, thereby relieving the pressure in the hydraulic system, including the hydraulic line 39, and the control cylinder 40. When the pressure is thus relieved in the hydraulic system (or the pressure is relieved in the system by reason of leakage in the fluid lines serving the slave cylinders of the service brake system) the piston 42 in the control cylinder 40 is moved downwardly under the influence of the spring 43. This also causes a corresponding movement of the piston rod 44, clevis 45 and the latch plate 47, causing an engagement between the latch plate 47 and the latch pin 50, as shown in FIGS. 3 and 4. The solenoid 33, being in series with the solenoid 32, is also de-energized, permitting a dog 53 to move into locking engagement with the ratchet 52, under the influence of the rod 56, rocker arm 57 and the torsion spring 58. In this condition the operation of the brake lever 11, then independently sets and locks the emergency brake, through the latch plate 47 and the emergency brake rod 49, without affecting the service brakes. If for any reason there is a loss of brake fluid while driving, the loss of pressure in the master cylinder 13 will cause the piston 42 to move downwardly in the cylinder 40, and causing the engagement of the latch plate 47, with the latch pin 50. In this condition the service brakes are automatically made operative through the brake lever 11, but since the ignition switch 36A is still "on" the solenoid 33 remains energized to lift the dog 53 out of engagement with the ratchet 52, so that the emergency brake rod 49 will follow the movement of the brake lever 11, without being locked in position. If for any reason it is desirable to move the motor vehicle, when it is parked and the engine is not running, the emergency brake lock may be released by pulling the handle 59 on the dash 60.

It will be understood that the loss of electrical energy in the electrical system automatically de-energizes the solenoids 32 and 33, which then automatically places the emergency brake mechanism in operation through the brake lever 11.

Although I have herein shown the use of solenoids to move the slide valve 22, and actuate the unlocking means for the emergency brake, it is also within the contemplation of the invention to power actuate these elements hydraulically, or by means of vacuum, which power is readily available in conventional vehicles.

Having described my invention, what I claim and desire to secure by Letters Patent is:

1. In a motor vehicle, having a power operated service brake mechanism, including a foot lever for actuating said service brake, an emergency brake mechanism, and an automatic transmission speed selector mechanism, the combination of power means associated with said power operated service brake mechanism foot lever, and said emergency brake mechanism, and responsive to the setting of said speed selector mechanism for independently effecting the application of power to said service brake mechanism and effecting the application of power to said emergency brake mechanism by said foot lever.

2. The structure of claim 1, in which said power operated service brake mechanism includes a hydraulic system, and said associated power means include a fluid valve in said system and means to actuate said valve to cause hydraulic power to be applied to said service mechanism and to a hydraulic cylinder associated with said emergency brake mechanism, for locking said emergency brake out of operating poistion when said speed selector mechanism is in one setting, and to by-pass said hydraulic power to permit the operation of said emergency brake by said foot lever when said speed selector mechanism is in another setting.

3. The structure of claim 1, in which said power operated service brake mechanism includes a hydraulic system and said associated power means include a fluid valve, a by-pass in said hydraulic system, controlled by said valve, and means to actaute said valve, said valve being actuated in one direction to by-pass said service brake mechanism when said speed selector is in "park" position, and said valve being actuated in the other direction to insure application of fluid pressure to said service brake mechanism, when said speed selector is in any position other than "park."

4. The structure of claim 1, in which said power operated service brake mechanism includes a hydraulic system in which there is positioned a fluid reservoir, a fluid cylinder and a piston, and said associated power means include a fluid by-pass, a valve for opening and closing said by-pass, and means for actuating said valve, there being a second fluid cylinder mounted on said foot lever and in communication with said first named cylinder and having its piston attached to the emergency brake mechanism, said last named cylinder and piston serving to lock said foot lever to said emergency brake mechanism, when said by-pass is opened by said valve, and serving to unlock said foot lever from said emergency brake mechanism when said by-pass is closed by said valve.

5. The structure of claim 1, in which said power operated service brake mechanism includes a hydraulic system in which there is positioned a fluid reservoir, a fluid cylinder and a piston, and said associated power means include a fluid by-pass, a valve for opening and closing said by-pass, there being a second fluid cylinder mounted on said foot lever and in communication with said first named cylinder and having its piston attached to the emergency brake mechanism, said last named cylinder and piston serving to lock said foot lever to said emergency brake mechanism, when said by-pass is opened by said valve, and serving to unlock said foot lever from said emergency brake mechanism when said by-pass is closed by said valve, there being additional power means responsive to the positioning of said speed selector mechanism for actuating said valve.

6. The structure of claim 1, in which said power operated service brake mechanism includes a hydraulic system in which there is positioned a fluid reservoir, a fluid cylinder and a piston, and said associated power means include a fluid by-pass and a valve for opening and closing said by-pass, there being a second fluid cylinder mounted on said foot lever and in communication with said first named cylinder and having its piston attached to the emergency brake mechanism, said last named cylinder and piston serving to lock said foot lever to said emergency brake mechanism, when said by-pass is opened by said valve, and serving to unlock said foot lever from said emergency brake mechanism when said by-pass is closed by said valve, there being additional power means responsive to the positioning of said speed selector mechanism for locking said foot lever in emergency brake applied position.

7. The structure of claim 1, in which said power operated service brake mechanism includes a hydraulic system in which there is positioned a fluid reservoir, a fluid cylinder and a piston, and said associated power means include a fluid by-pass and a valve for opening and closing said by-pass, there being a second fluid cylinder mounted on said foot lever and in communication with said first named cylinder and having its piston attached to the emergency brake mechanism, said last named cylinder and piston serving to lock said foot lever to said emergency brake mechanism, when said by-pass is opened by said valve, and serving to unlock said foot lever from said emergency brake mechanism when said by-pass is closed by said valve, there being additional power means responsive to the positioning of said speed selector mechanism for locking said foot lever in emergency brake applied position, and means for releasing said last named locking means.

8. In a motor vehicle having a power operated service brake mechanism, a foot lever for actuating said brake, an independent emergency brake mechanism, and a transmission, including a speed selector mechanism, the combination of means, responsive to the positioning of said speed selector mechanism, for holding said foot lever out of engagement with said emergency brake mechanism, during the application of said service brakes, and for holding said foot lever in engagement with said emergency brake mechanism, in the event of failure of said service brakes.

9. The structure of claim 8, including means for locking said emergency brake mechanism, and said foot lever in emergency brake holding position, and means for releasing said last named means.

10. The structure of claim 8, in which said power operated service brake mechanism includes a vacuum cylinder and a hydraulic system, there being a by-pass in said system and a valve for controlling said by-pass, said valve being actuated to close said by-pass by a solenoid arranged in series with a normally closed switch and the conventional ignition switch of said vehicle, said normally closed switch being opened by the said speed selector mechanism when the latter is moved to "park" position.

11. The structure of claim 8, in which said power operated service brake mechanism includes a vacuum cylinder and a hydraulic system, in which there is a by-pass and a valve for controlling said by-pass, said valve being actuated to close said by-pass by a solenoid arranged in series with a normally closed switch and the conventional ignition switch of said vehicle, said normally closed switch being opened by the said speed selector mechanism when the latter is moved to "park" position, there being a hydraulic cylinder pivoted to said foot lever, said cylinder having a piston therein, which is connected to the emergency brake mechanism, said cylinder being in communication with said hydraulic system and actuable thereby to hold said emergency brake mechanism disconnected from said foot lever when said by-pass is closed, and spring means to cause the connection between said emergency brake mechanism and said foot lever when said by-pass is open.

12. The structure of claim 8, in which said power operated service brake mechanism includes a vacuum cylinder and a hydraulic system, in which there is a by-pass and a valve for controlling said by-pass, said valve being actuated to close said by-pass by a solenoid arranged in series with a normally closed switch and the conventional ignition switch of said vehicle, said normally closed switch being opened by the said speed selector mechanism when the latter is moved to "park" position, there being a hydraulic cylinder pivoted to said foot lever, said cylinder having a piston therein, which is connected to the emergency brake mechanism, said cylinder being in communication with said hydraulic system and actuable thereby to hold said emergency brake mechanism disconnected from said foot lever when said by-pass is closed and spring means to cause the connection between said emergency brake mechanism and said foot lever, when said by-pass is open, there being a second solenoid in series with said first named solenoid, which when energized holds said foot lever and said emergency brake mechanism in applied position while said by-pass is open.

References Cited in the file of this patent

UNITED STATES PATENTS

| | | |
|---|---|---|
| 1,662,183 | Chann | Mar. 13, 1928 |
| 2,821,275 | Martin | Jan. 28, 1958 |
| 2,910,156 | Apple | Oct. 27, 1959 |